US008458780B1

(12) United States Patent
Takkallapally et al.

(10) Patent No.: US 8,458,780 B1
(45) Date of Patent: Jun. 4, 2013

(54) PLUGGABLE LOGIN ARCHITECTURE AND DYNAMIC RESOURCE RECOGNITION

(75) Inventors: Anirudh Takkallapally, Natick, MA (US); Scott Joyce, Foxboro, MA (US); Bruce Rabe, Dedham, MA (US); Munish Desai, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 659 days.

(21) Appl. No.: 12/643,199

(22) Filed: Dec. 21, 2009

(51) Int. Cl.
*G06F 7/04* (2006.01)
(52) U.S. Cl.
USPC ........ 726/7; 726/4; 726/17; 726/21; 713/168; 713/182
(58) Field of Classification Search
None
See application file for complete search history.

(56) References Cited

U.S. PATENT DOCUMENTS

| 7,134,137 | B2* | 11/2006 | Joshi et al. ............... 726/1 |
| 7,254,814 | B1* | 8/2007 | Cormier et al. ........... 718/106 |
| 7,631,344 | B2* | 12/2009 | Gustave et al. ............ 726/2 |
| 2003/0212887 | A1* | 11/2003 | Walther et al. ........... 713/151 |
| 2004/0158720 | A1* | 8/2004 | O'Brien .................. 713/176 |
| 2007/0101418 | A1* | 5/2007 | Wood et al. .............. 726/8 |

* cited by examiner

*Primary Examiner* — Shewaye Gelagay
(74) *Attorney, Agent, or Firm* — Nutter McClennen & Fish LLP

(57) ABSTRACT

Methods and systems are disclosed that generally involve handling logins for a user accessing a plurality of computer resources. In one embodiment, once a user enters login information for a first computer resource, the login information can be stored and/or re-used to access a plurality of other computer resources without the user having to re-enter the login information for each resource. The methods and systems can involve a software framework in communication with various plugins, each plugin including one or more login candidates representing a type of a computer resource. The plugins and/or login candidates can allow the framework to pluggably and dynamically recognize and log into various types of computer resources.

14 Claims, 12 Drawing Sheets

PLUGGABLE LOGIN ARCHITECTURE AND DYNAMIC RESOURCE RECOGNITION

FIELD

The present invention relates to methods and systems for logging into computer resources.

BACKGROUND

Information services and data processing industries in general have rapidly expanded as a result of the need for computer systems to manage and store large amounts of data. As an example, financial service companies such as banks, mutual fund companies and the like now, more than ever before, require access to many terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs).

A variety of storage systems (also referred to herein as "storage arrays" or simply "arrays") are known in the art. One example of a storage system is a collection of storage devices (e.g. hard disk drives) and associated communication, power, cooling, and management components. Such storage systems can also include one or more storage processors for handling both requests for allocation and input/output (IO) requests from a user. A storage processor can be the controller for and primary interface to the storage system.

Storage systems are typically used to provide storage space for one or more computer file systems, databases, applications, and the like. For this and other reasons, it is common for storage systems to be logically partitioned into chunks of storage space. This allows a unified storage system to appear as a collection of separate file systems, network drives, etc. Storage systems can be logically partitioned in a variety of ways. For example, the storage devices (e.g., disk drives) of a storage system can be logically organized into one or more RAID groups. A RAID group is a group of physical storage devices across which data can be distributed and/or replicated to achieve redundancy. This can avoid the loss or unavailability of data arising from a hardware failure such as a disk drive failure. Alternatively, or in addition, the physical storage area of a storage system can be mapped to one or more "logical units" (LUs).

In a storage area network, a collection of storage systems can be networked together via a switching fabric to a number of host computer systems operating as servers. The host computers can access data stored in the storage systems (of a respective storage area network) on behalf of client computers that request data from the data storage systems. For example, according to conventional applications, upon receiving a storage access request, a respective host computer in the storage area network can access a large repository of storage through the switching fabric of the storage area network on behalf of the requesting client. Thus, via the host computer (e.g., server), the client has access to the shared storage system. In many applications, storage area networks support high-speed acquisitions of data so that the host servers are able to promptly retrieve data from and store data to the storage system.

One or more management systems or applications are generally required to administer storage area networks. Conventional storage area network management applications typically include a graphical user interface (GUI) that enables a network manager to graphically manage, control, and configure various types of hardware and software resources associated with a corresponding managed storage area network. For example, a conventional storage management application can generate a GUI that can be used by a storage administrator to graphically select, interact with, and manage local or remote devices and software processes associated with the storage area network. The GUI, in combination with an input device such as a hand operated mouse and corresponding pointer displayed on a viewing screen or other display, can allow a storage administrator to manage hardware and software entities such as file systems, databases, storage devices, volumes, peripherals, network data communications devices, RAID groups, LUs, etc., associated with the storage area network. Consequently, a storage management station and associated management software enables a storage administrator (a person responsible for managing the storage network) to manage the storage area network and its resources.

One problem with existing management methods and systems is that each computer resource associated with a storage area network can require its own login procedure for authenticating a user to the resource. Since storage area networks usually include multiple such resources, there is a need for methods and systems that can efficiently authenticate or log in a user to multiple computer resources.

Another problem with existing methods and systems is that they cannot recognize or log into computer resources that were not supported or contemplated when the method or system was designed. Thus, there is a need for pluggable login methods and systems that can support logins to initially unrecognized systems via registration of an appropriate plugin.

Yet another drawback to existing methods and systems is that they cannot dynamically recognize the various computer resources available for a user to log into. A user must typically know the specific addresses and types of each resource in order to log into that resource. Accordingly, there is a need for methods and systems that can dynamically discover available computer resources and recognize the type or types of such resources.

SUMMARY

The methods and systems disclosed herein generally involve handling logins for a user accessing a plurality of computer resources. In one embodiment, once a user enters login information or "credentials" for a first computer resource, the credentials can be stored and/or re-used to access a plurality of other computer resources without the user having to re-enter the credentials for each resource. The methods and systems can involve a software framework in communication with various plugins, each plugin including one or more login candidates, each representing a type of a computer resource. The plugins and/or login candidates can allow the framework to pluggably and dynamically recognize and log into various types of computer resources.

In a first aspect, a system is provided for handling logins for a first user accessing a plurality of computer resources of at least one type, with each computer resource needing to be logged into, across a computer network. The system can include one or more processors each connected to memory and programmed to provide a software framework having a login service and at least one software plugin. The at least one software plugin can communicate with the framework and can include one or more login candidates, each login candidate representing a type of a computer resource and each login candidate registering with the login service. The one or more processors can be further programmed to, upon request from the first user for access to a first computer resource across the computer network, review the login candidate registrations of the login service to find a first login candidate representing the type of the first computer resource. The one or more processors can also be further programmed to communicate with the first login candidate to determine login information needed to access the first computer resource, prompt the first user for the login information and receive the login information, and apply the login information received to log the first user into the first computer resource. In one embodiment, a plurality of the computer resources can be storage devices and in another embodiment, substantially all of the computer resources can be storage devices.

In one embodiment, the one or more processors can be further programmed to acquire a list of one or more computer resources and, using the login information, attempt to log into each computer resource in the list having a type for which a corresponding login candidate has been registered. In one embodiment, the list of computer resources can be acquired from the first computer resource after logging in. Alternatively, or in addition, the list of computer resources can be persisted in and acquired from a storage device coupled to the one or more processors.

The login information can include various information, including for example a user name, a password, an image of a fingerprint, an account number, and/or a personal identification number. In one embodiment, the one or more processors can be further programmed to store the login information.

In another embodiment, the one or more processors can be further programmed to, upon request from the first user for access to a second computer resource across the computer network, review the login candidate registrations of the login service to find a second login candidate representing a type of the second computer resource and communicate with the second login candidate to determine login information needed to access the second computer resource. The one or more processors can be further programmed to, if any of the login information needed to access the second computer resource is not already stored by the one or more processors, prompt the first user for any needed and unstored login information and apply the login information to log the first user into the second computer resource.

In a further aspect, a non-transitory computer-readable storage medium is provided with an executable program stored thereon for handling logins for a first user accessing a plurality of computer resources of at least one type, with each computer resource needing to be logged into, across a computer network. The program can instruct one or more processors to provide a software framework having a login service and provide at least one software plugin that communicates with the framework, wherein the at least one plugin includes one or more login candidates, each login candidate representing a type of a computer resource and each login candidate registering with the login service. The program can instruct the one or more processors to, upon request from the first user for access to a first computer resource across the computer network, review the login candidate registrations of the login service to find a first login candidate representing the type of the first computer resource and to communicate with the first login candidate to determine login information needed to access the first computer resource. The program can also instruct the one or more processors to prompt the first user for the login information and receive the login information and to apply the login information received to log the first user into the first computer resource. In one embodiment, a plurality of the computer resources are storage devices and in another embodiment, substantially all of the computer resources are storage devices.

The program can further instruct the one or more processors to acquire a list of one or more computer resources and, using the login information, attempt to log into each computer resource in the list having a type for which a corresponding login candidate has been registered. In one embodiment, the list of computer resources can be acquired from the first computer resource after logging in. In another embodiment, the list of computer resources can be persisted in and acquired from a storage device coupled to the one or more processors. The login information can include at least one of a user name, a password, an image of a fingerprint, an account number, and a personal identification number.

In one embodiment, the program can further instruct the one or more processors to store the login information. The program can also instruct the one or more processors to, upon request from the first user for access to a second computer resource across the computer network, review the login candidate registrations of the login service to find a second login candidate representing a type of the second computer resource and communicate with the second login candidate to determine login information needed to access the second computer resource. The program can also instruct the one or more processors to, if any of the login information needed to access the second computer resource is not already stored by the one or more processors, prompt the first user for any needed and unstored login information and to apply the login information to log the first user into the second computer resource.

BRIEF DESCRIPTION OF THE DRAWINGS

The invention will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. A number of problems with conventional methods and systems are noted in the "background" section of this application and the methods and systems disclosed herein may address one or more of these problems. By describing these problems, no admission as to their knowledge in the art is intended.

Figure 1:
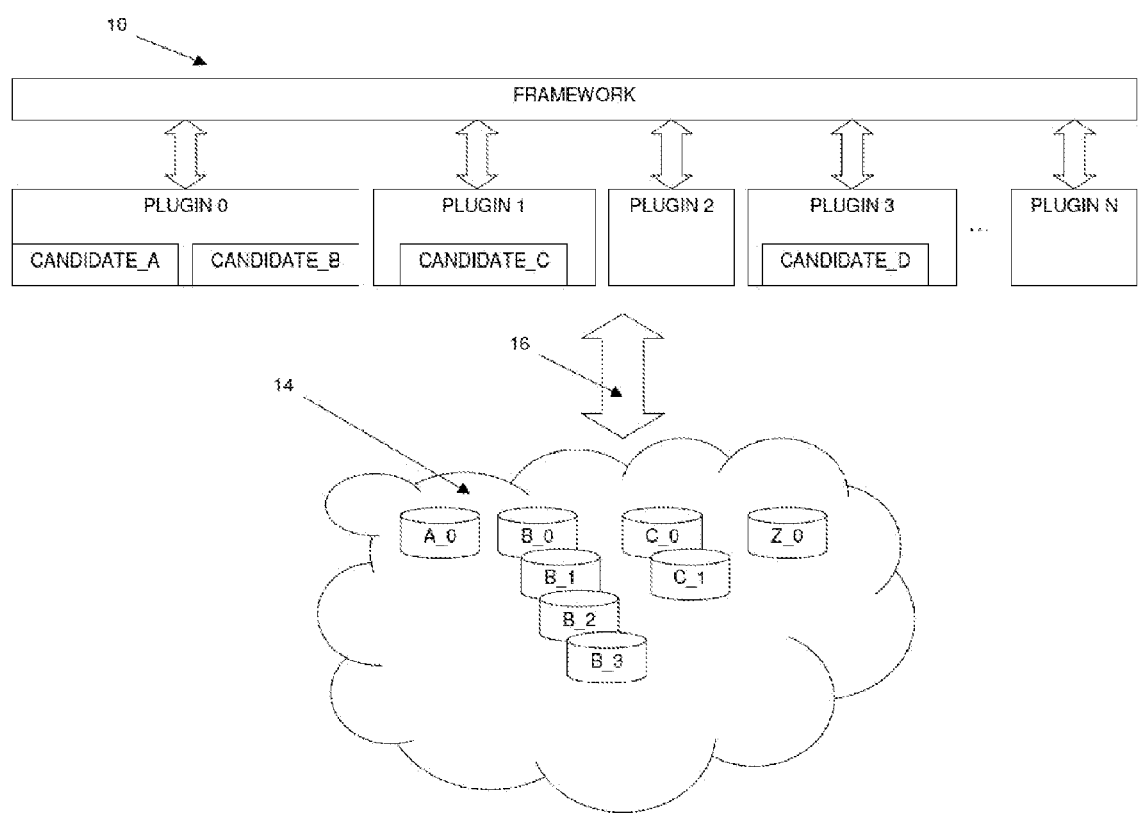
FIG. 1 is a block diagram of a plurality of computer resources and one embodiment of a system for logging into one or more of the computer resources.

FIG. 1 illustrates a plurality of computer resources and one embodiment of a system for logging into one or more of the computer resources. The system generally includes a framework 10 and one or more plugins (PLUGIN 0, PLUGIN 1, etc.) registered therewith. The plugins can include one or more login candidates (CANDIDATE_A, CANDIDATE_B, etc.) associated therewith that can also be registered with the framework 10. As shown, one or more plugins (e.g., PLUGIN 2 and PLUGIN N) can have no associated login candidates. The framework 10 and/or the various plugins can be in communication with a plurality of computer resources 14 via a communication medium 16. In use, the framework 10 can allow one or more users to log into one or more of the computer resources 14. Examples of computer resources can include data storage systems, personal computers, server computers, databases, websites, archives, collections, FTP sites, network components, printers, network drives, file systems, operating systems, programs, applets, documents, files, etc.

Figure 2:
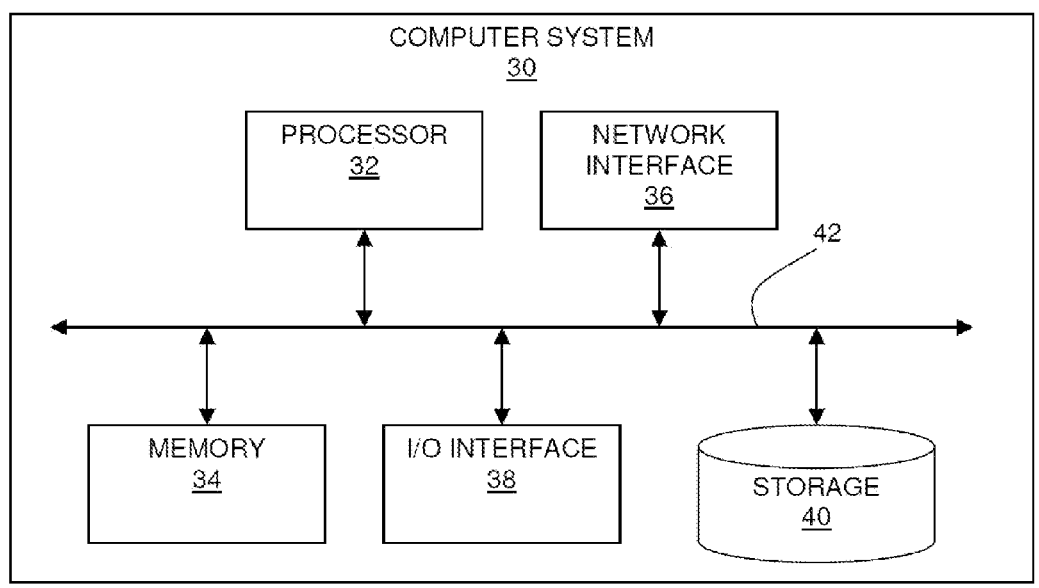
FIG. 2 is a block diagram of one embodiment of a computer system.

In one embodiment, the framework 10 and plugins can be implemented as one or more software modules that are executed on a computer system. Hardware or special purpose integrated circuits or controllers could also be configured to implement the framework 10 or plugins. FIG. 2 illustrates one exemplary embodiment of a computer system 30. As shown, the computer system 30 includes one or more processors 32 which can control the operation of the computer system 30. The processor(s) 32 can include any type of microprocessor or central processing unit (CPU), including programmable general-purpose or special-purpose microprocessors and/or any one of a variety of proprietary or commercially available single or multi-processor systems, such as an Intel-based processor. The computer system 30 can also include one or more memories 34, which can provide temporary storage for code or data to be executed by the processor(s) 32. The memory 34 can include read-only memory (ROM), flash memory, one or more varieties of random access memory (RAM) (e.g., static RAM (SRAM), dynamic RAM (DRAM), or synchronous DRAM (SDRAM)), and/or a combination of memory technologies.

The various elements of the computer system 30 can be coupled to a bus system 42. The illustrated bus system 42 is an abstraction that represents any one or more separate physical busses, communication lines/interfaces, and/or multi-drop or point-to-point connections, connected by appropriate bridges, adapters, and/or controllers. The computer system 30 can also include one or more network interface(s) 36, one or more input/output (IO) interface(s) 38, and one or more storage device(s) 40.

The network interface(s) 36 can enable the computer system 30 to communicate with remote devices over a network, and can be, for example, remote desktop connection interfaces, Ethernet adapters, and/or other local area network (LAN) adapters. The IO interface(s) 38 can include one or more interface components to connect the computer system 30 with other electronic equipment, for example, custom connections, blade adapters, etc. Additionally, the computer system 30 can be accessible to a human user, and thus the IO interface(s) 38 can include displays, speakers, keyboards, pointing devices, and/or various other video, audio, or alphanumeric interfaces. The storage device(s) 40 can include any conventional medium for storing data in a non-volatile and/or non-transient manner. The storage device(s) 40 can thus hold data and/or instructions in a persistent state (i.e., the value is retained despite interruption of power to the computer system 30). The storage device(s) 40 can include one or more hard disk drives, solid-state disk drives, flash drives, USB drives, optical drives, various media cards, and/or any combination thereof and can be directly connected to the computer system 30 or remotely connected thereto, such as over a network. The elements illustrated in FIG. 2 can be some or all of the elements of a single physical machine. In addition, not all of the illustrated elements need to be located on or in the same physical machine.

The framework 10 of FIG. 1, as well as any other methods and systems disclosed herein, can be implemented and/or performed by the processor(s) 32 of the computer system 30 according to instructions contained in a program, which can be stored in the memory 34, or in a variety of other computer-readable storage media. For example, the program can be stored in the storage device(s) 40, which as discussed above can include a USB drive, optical disc, or other storage medium known in the art which can be read and/or written by the computer system 30.

Figure 3:
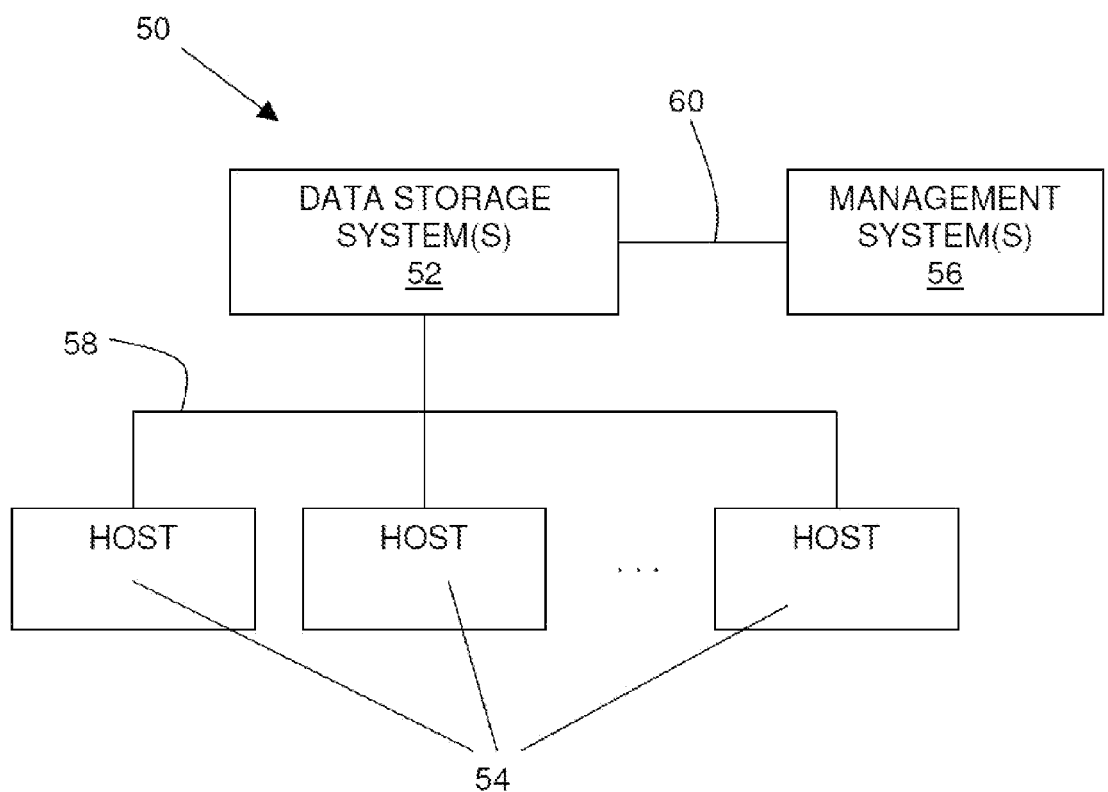
FIG. 3 is a block diagram of one embodiment of a storage area network.

Computer systems, such as the computer system 30 shown in FIG. 2, can be used for a variety of purposes. FIG. 3 illustrates one embodiment of a storage area network (SAN) 50 that includes a plurality of computer systems. As shown, the SAN 50 includes one or more data storage systems 52 connected to one or more host systems 54 through a communication medium 58. The SAN 50 also includes one or more management systems 56 connected to one or more of the data storage systems 52 through a communication medium 60. In the illustrated embodiment, any or all of the management system(s) 56, the data storage system(s) 52, and the host system(s) 54 can be or can include one or more computer systems similar or identical to the computer system 30 of FIG. 2. The particular examples of the hardware and software that can be included in the SAN 50 described herein are non-limiting examples and can vary with each particular embodiment. The host system(s) 54, data storage system(s) 52, and management system(s) 56 can all be located at the same physical site, or, alternatively, can be located in different physical locations.

In the illustrated SAN 50, the management system(s) 56 and host system(s) 54 can access the data storage system(s) 52 to perform a variety of tasks, including for example performing IO operations, data requests, and/or various management operations. Exemplary data storage systems are available from various vendors or manufacturers, such as EMC Corporation of Hopkinton, Mass. As will be appreciated by those skilled in the art, however, the methods and systems described herein are applicable for use with other data storage systems available from other vendors and with other components than as described herein for purposes of example. Certain embodiments can also include data storage systems from multiple vendors.

The communication medium 58 can be any one or more of a variety of networks or other types of communication connections known to those having ordinary skill in the art. For example, each of the communication mediums 58 and 60 can be a network connection, a bus, the Internet, an intranet, various wired or wireless connection(s), and/or any combination thereof. The host system(s) 54, data storage system(s) 52, and/or management system(s) 56 can be connected to the communication mediums 58, 60 via a network interface similar to the network interface 36 of the computer system 30 of FIG. 2 and/or via an IO interface similar to the IO interface 38 of the computer system 30. The communication mediums 58, 60 can use a variety of different communication protocols, including without limitation TCP/IP, SCSI, Fibre Channel (FC), iSCSI, SAS, and the like. In one embodiment, the communication medium 60 can be a TCP/IP LAN connection and the communication medium 58 can be a Fibre Channel connection. Some or all of the connections by which the host system(s) 54 and the data storage system(s) 52 are connected to the communication medium(s) can pass through other communication devices, such as a Connectrix, available from EMC Corporation of Hopkinton, Mass., or other switching equipment that may exist such as a phone line, a repeater, a multiplexer, and/or a satellite. Although FIG. 3 illustrates communications between the host system(s) 54 and data storage system(s) 52 as being over a first connection, and communications between the management system(s) 56 and the data storage system(s) 52 as being over a second different connection, an embodiment can also use the same connection. The particular type and number of connections may vary in accordance with the particulars of each embodiment.

The host system(s) 54 can perform different types of data operations in accordance with different types of tasks. In the embodiment of FIG. 3, any one of the host systems 54 can issue a data request to the data storage system(s) 52 to perform a data operation. For example, an application executing on one of the host systems 54 can perform a read or write operation resulting in one or more data requests to the data storage system(s) 52. In one embodiment, the host system(s) 54 do not address the disk drives or other storage devices of the storage systems 52 directly, but rather access to data is provided from what the host systems view as a plurality of logical devices, logical volumes, and/or logical units. These logical associations may or may not correspond to actual physical disk drives. For example, one or more logical units may reside on a single physical disk drive. Data in a single storage system can be accessed by multiple hosts allowing the hosts to share the data residing therein.

The management system(s) 56 can include hardware and/or software components and can be used in connection with management of the data storage system(s) 52. In one embodiment, the management system(s) 56 include a computer system such as the computer system 30 of FIG. 2. The management system(s) 56 can thus include a processor that can be programmed to display various information about the storage system(s) 52 to a user and to obtain or receive various inputs from the user for configuring, adjusting, managing, and/or performing various other administrative tasks with respect to the storage system(s) 52. The number and type of components included in the management system(s) 56 can vary with the complexity of the storage system(s) 52 as well as the particular applications and tasks performed in a particular embodiment.

The management system(s) 56 can also include various software components, including for example a graphical user interface (GUI) and one or more programs or applications. The software components of the management system(s) 56 can be discrete or can be distributed throughout the SAN 50. In one embodiment, the management system(a) 56 can be one or more software programs that are stored and executed on one or more of the data storage systems 52 and can be accessible to a user via a remote desktop interface. The management system(s) 56 can employ one or more object-oriented computer languages such as C++, XML (eXtensible Markup Language), Java, etc. to implement various software components. In one embodiment, Java technology can be used to advantageously allow for creation of web-based and/or computer-platform-independent management system(s) 56.

Java technology generally includes an object oriented programming language and a platform on which to run the Java applications. Java is both a compiled and an interpreted language. Java source code can be compiled into an intermediate form called a Java bytecode, which is a platform independent language. On a particular machine, the java bytecodes are interpreted by the Java platform and a Java interpreter parses and runs each Java bytecode instruction. If the Java bytecode is run as a applet, it can first be sent over a network to the machine. The Java platform includes an Application Programming Interface (API), which is a large collection of ready-made software components that provide a variety of capabilities, and the Java Virtual Machine (JVM). Together, the JVM and the API sit on top of hardware based computer platforms and provide a layer of abstraction between the Java program and the underlying hardware. The JVM is software that can run a Java program on a specific computer platform of a client machine. Before a Java program can be run on a JVM, the Java program must first be translated into a format that the JVM recognizes, which is called a Java class file format. The Java class file format contains all the information needed by a Java runtime system to define a single Java class.

Referring again to FIG. 1, the computer resources 14 can be logically considered as part of one or more domains. One or more domains can be grouped for management purposes. A domain can be defined as a functionally bounded set of interconnected components, such as data storage systems, that communicate and/or cooperate for a common purpose. The particular data storage systems included in a domain can be user-configured. A user may want to perform operations for data storage system management at the domain level (e.g., for the data storage systems included in a domain). Thus, a user can accordingly configure one or more domains. In the illustrated example, a single domain is specified although embodiments can include a varying number of one or more domains. The domain can be configured to include one or more data storage systems. In certain embodiments, restrictions can exist such that the same storage system cannot belong to more than a single domain at any particular time.

Figure 4:
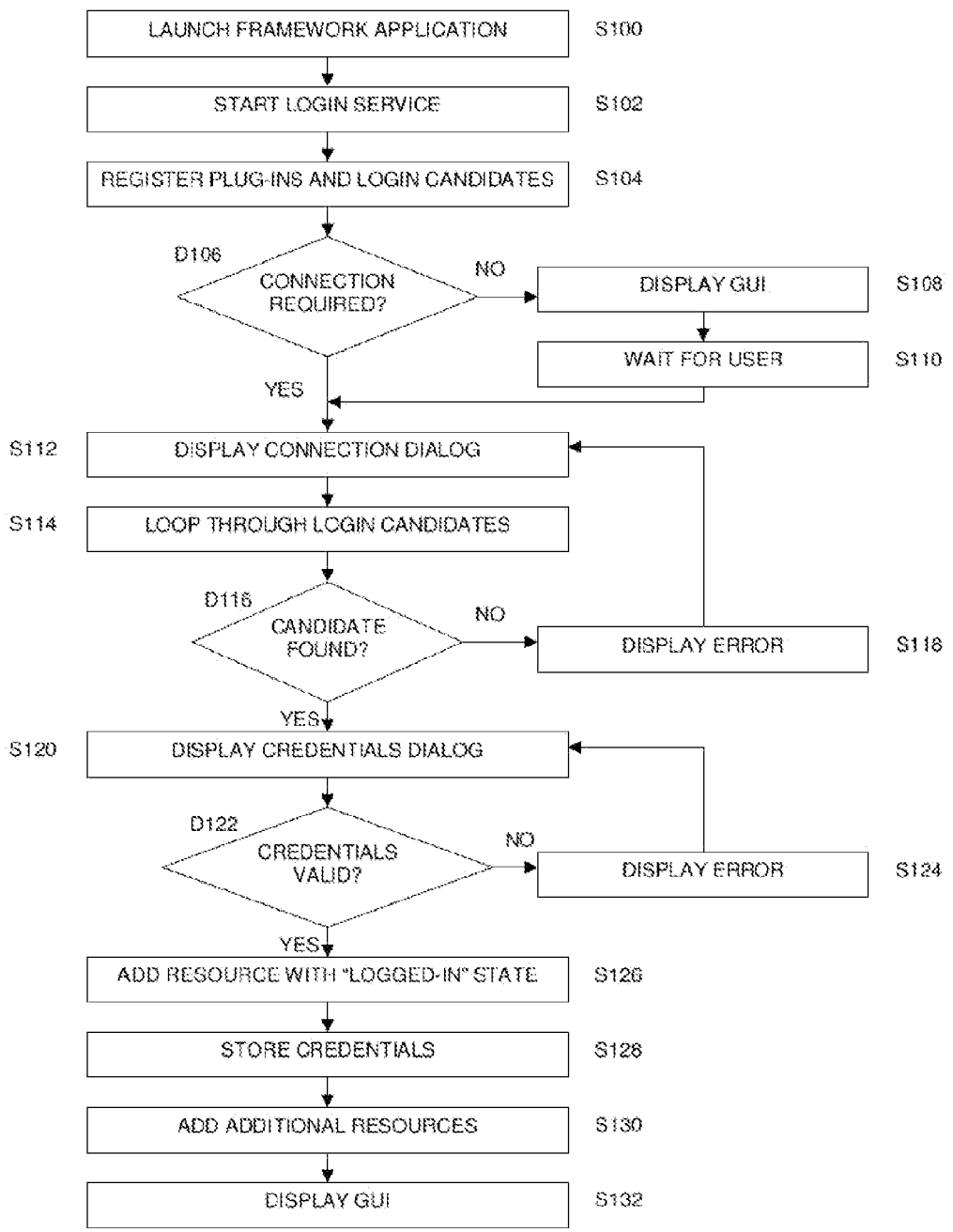
FIG. 4 is a flowchart of one embodiment of a method for logging into one or more computer resources.

FIG. 4 illustrates a flowchart of one exemplary embodiment of a method for logging into a plurality of computer resources. While various methods disclosed herein are shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowcharts are merely exemplary embodiments, various other methods that include additional steps or include fewer steps than illustrated are also within the scope of the present invention.

The methods disclosed herein, for example the method of FIG. 4 can be implemented on various of the physical components described herein, for example the data storage system(s) 52, the management system(s) 56, the host system(s) 54, virtually any computer system 30, and/or any combination thereof.

As shown in FIG. 4, the method can begin at step S100 when a user (e.g., a storage system administrator) launches a framework application, such as the framework 10 illustrated in FIG. 1. In one embodiment, the framework application is a application for managing a plurality of data storage systems, however various other framework applications for performing various other tasks are also within the scope of the present invention. The user can launch the framework application in a variety of ways, for example by starting an executable program, such as a Java program, or by pointing a web browser application to a particular address (e.g., an IP address or a URL).

When the framework application is launched, a login service can be started in step S102. One or more plugins and/or login candidates (such as those illustrated in FIG. 1) can register with the login service in step S104. In one embodiment, the plugins can be software components (e.g., Java classes or archives of Java classes). The plugins can be stored on the same physical device as the framework application (e.g., a management system 56) or can be distributed amongst a plurality of physical devices. For example, the framework application can be stored on a management system 56 while various plugins are stored on a plurality of data storage systems 52. The plugins can register with the login service in a variety of ways. In one embodiment, the login service can be configured to look for available plugins, for example by reading an XML file containing a list of plugin files and their respective locations, by looking in a file-system folder in which plugins are typically stored, and/or by looking at registry entries (e.g. in a Microsoft Windows based operating system).

Each plugin can optionally include one or more login candidates. In one embodiment, a login candidate is a set of functions, data structures, classes, objects, etc. configured to handle a login procedure with a particular type of computer resource. In other words, the plugins and/or the login candidates can be application specific. For example, a login candidate can "know" what types of credentials are required for a particular computer resource type, the order in which such credentials must be entered, etc. One example of a computer resource might be a data storage system of type "A" that can be logged into remotely over a network to perform various management tasks associated with the data storage system. Data storage systems of type "A" might require a user name and a password to authenticate a user. Accordingly, in the method of FIG. 4, a login candidate can be provided that defines various objects and functions for transmitting a user name and a password over a network to data storage systems of type "A." The login candidate can include various other resource type-specific routines or objects as may be required.

Each of the plugins and any login candidates included therein can be registered with the framework application and can be in communication therewith. The framework application can thus maintain a list of registered plugins and/or registered login candidates and can execute program functions or manipulate program objects defined therein. Plugins need not necessarily be limited to simply login functionality, but rather can include an entire suite of features for communicating with and/or managing computer resources.

When the framework application of FIG. 4 is launched, it can optionally determine whether a connection dialog should be displayed to the user before displaying a main framework application GUI in decision block D106. The framework can check to see if a "connection required" parameter is set, which can be a runtime parameter. If the "connection required" parameter is not set (e.g., has a value of FALSE or a value equivalent thereto), the framework can display the main application GUI at step S108 and then the login service can simply wait in the background at step S110 for a user to initiate a connection. For example, the login service can sit idle until a user selects a "connect" menu item or push button in the main application GUI.

If the "connection required" parameter is set (e.g., has a value of TRUE or a value equivalent thereto), or if the "connection required" parameter was not set but the user later initiated a connection, the framework can display a connection dialog at step S112. The connection dialog can prompt a user for various information for identifying a computer resource to log in to. In one embodiment, the connection dialog can prompt a user for an IP address of a computer resource. While the examples given below generally refer to use of an IP address, the connection dialog can prompt for virtually any information that can identify a particular computer resource or resources, such as one or more of a URL (such as an HTTP address or an FTP address), a local path and/or filename, a MAC address, and the like. In one embodiment, for example where the framework is launched as an applet embedded in a web page, instead of or in addition to using a connection dialog, the URL entered for the webpage can be used to determine the computer resource that the user seeks to log into.

Figure 5:
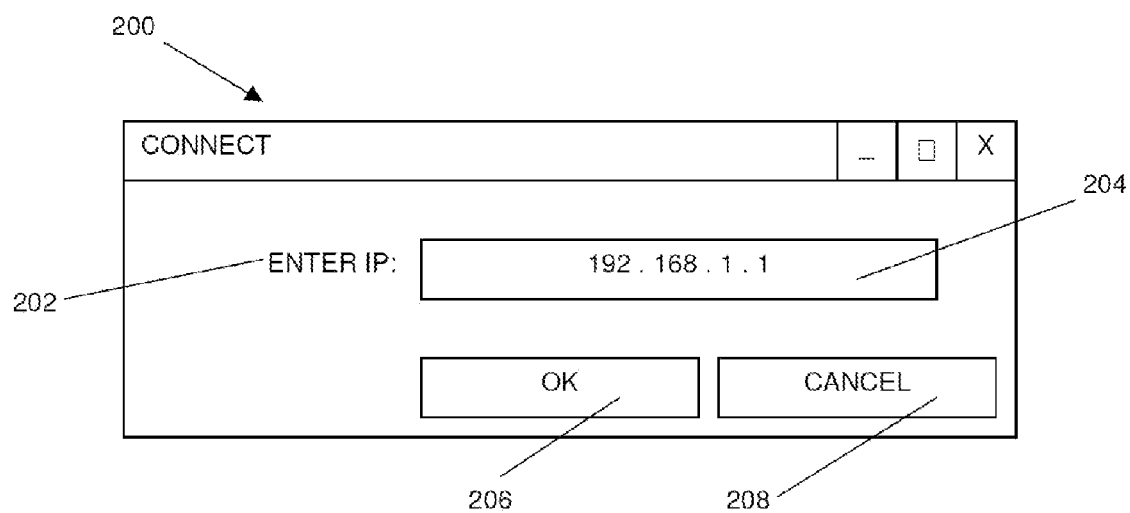
FIG. 5 is an illustration of one embodiment of a connection dialog.

FIG. 5 illustrates one embodiment of a connection dialog 200. As shown, the dialog contains a text label 202 prompting a user to enter an IP address in a text box 204. The dialog also contains an OK button 206 and a CANCEL button 208. If the user selects the CANCEL button 208, the dialog can be dismissed and the framework application can terminate (e.g., if the connection required attribute is set) or the framework can simply display the main application GUI (e.g., if the connection required attribute is not set).

If the user selects the OK button 206 in the connection dialog 200, the login service can dynamically detect the type of the computer resource that the user is trying to log into. This can desirably allow the user to log into a particular computer resource without knowing what type of resource it is, since the login service can automatically detect the resource type using the registered login candidates. For example, as shown in FIG. 4, the login service can loop through the registered login candidates at step S114 to find an appropriate candidate for the IP address entered by the user. The login service can iterate through each registered login candidate until an appropriate candidate is found. Each login candidate can attempt to communicate with the computer resource having the entered IP address, for example by sending and/or receiving TCP/IP packets to that address.

The computer resource and the login candidate or candidates can be configured to "handshake" or otherwise engage in two-way communications with each other to determine if a support relationship exists. For example, referring to FIG. 1, if the user enters the IP address of a computer resource C_0, the framework 10 can loop through the registered login candidates (CANDIDATE_A, CANDIDATE_B, CANDIDATE_C, and CANDIDATE_D). First, CANDIDATE_A can send an initial TCP/IP packet to the computer resource at the entered IP address (resource C_0). Since CANDIDATE_A is configured to communicate with computer resources of type A and resource C_0 is of type C, resource C_0 might not respond to the initial packet or might respond in a way that is incomprehensible to CANDIDATE_A. Accordingly, CANDIDATE_A can indicate to the framework 10 that it is not an appropriate login candidate for computer resource C_0. The process can then repeat for CANDIDATE_B with similar results. When the framework gets to CANDIDATE_C however, the computer resource C0 can recognize the initial packet sent by CANDIDATE_C and can respond with one or more packets that can be recognized by the login candidate. Upon recognizing said packets, CANDIDATE_C can engage in additional communications with the computer resource C_0 to verify that it is in fact an appropriate login candidate therefor, and/or CANDIDATE_C can communicate to the framework that it is an appropriate login candidate for the computer resource C_0. Since CANDIDATE_C is a valid login candidate for resource C_0, the framework can skip CANDIDATE_D and any other remaining login candidates.

Referring again to FIG. 4, the framework can decide at decision block D116 if an appropriate login candidate has been found. If no login candidate was able to recognize the type of computer resource at the IP address entered by the user, an error message can be displayed at step S118 and execution can return to step S112 to allow the user to try re-entering an IP address. If the framework determines that an appropriate login candidate was found, either the framework or a plugin associated therewith can display a credentials dialog at step S120.

Figure 6:
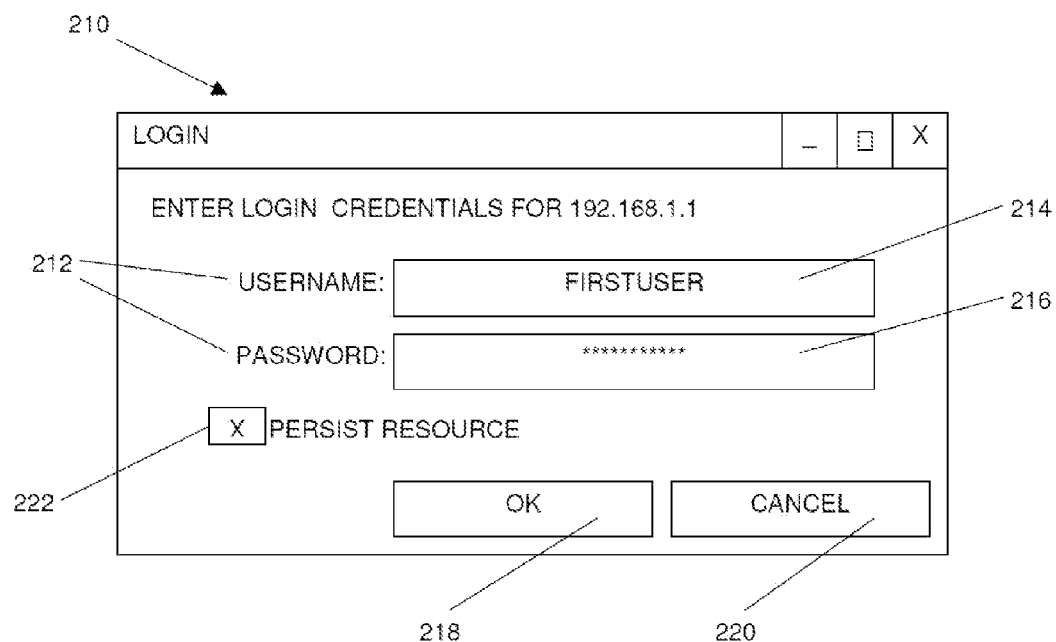
FIG. 6 is an illustration of one embodiment of a credentials dialog.

FIG. 6 illustrates one embodiment of a credentials dialog 210. In the illustrated embodiment, text labels 212 are provided to prompt the user to enter a username and a password into corresponding text boxes 214, 216. The dialog 210 also includes an OK button 218 and a cancel button 220. The credentials dialog 210 can also include a "persist resource" checkbox 222, the purpose of which is described below. A person skilled in the art will appreciate that the configuration and components of the credentials dialog 210 will vary in accordance with the type of computer resource that is being logged into. For example, referring to FIG. 1, if a computer resource of type C (e.g., computer resource C_0 or C_1) is being logged into, the login candidate CANDIDATE_C knows that resources of this type require a username and a password to authenticate a user and will thus include prompts for such information in the credentials dialog 210 or will instruct the framework to do so.

Other computer resources can require different credentials in order to authenticate a user. For example, computer resources of type A (such as computer resource A_0 in FIG. 1), might require a username, a password, and some additional information such as an account number. Thus, login candidate CANDIDATE_A can be configured to display a credentials dialog that includes prompts, fields, text boxes, and the like to allow a user to enter such credentials. Other examples of credentials that can be required by computer resources (and that can be prompted for and received by the credentials dialog) include usernames, passwords, account numbers, personal identification numbers, fingerprint images (whether imported from an image file or from an optical scanner), bar codes, security images, passkeys, tokens, security fob numbers (such as those provided by SecurID fobs available from RSA, a division of EMC Corporation of Hopkinton, Mass.), and/or various combinations thereof.

If a user selects the cancel button 220, the credentials dialog is dismissed as described above with respect to the cancel button 208 of the connection dialog 200. If a user selects the OK button 218, the login candidate can attempt to log into the computer resource selected by the user (e.g., the computer resource whose IP address the user entered). The results of this login attempt are processed at decision block D122 in FIG. 4. If the credentials were not valid such that the computer resource could not be logged into, an error message is displayed to the user indicating as much at step S124. Execution can then return to step S120, where the user can be prompted to re-enter credentials for logging into the computer resource. Various security features known in the art can be provided in the situation where the user enters invalid credentials. For example, after a certain number of unsuccessful login attempts, the user can be barred from logging into a given resource for a specified period of time, or until their account is reset by an account administrator.

Upon entering valid credentials (e.g., credentials that are sufficient to log the user into the computer resource), a "scope" can be created and/or added corresponding to the computer resource at step S126. A scope can be a software object for referencing a particular resource. Scopes can be used for a variety of tasks, as explained below. Since the login attempt was successful, the state of the created scope can be set to "LOGGED-IN."

The framework and or the plugin containing the selected login candidate can optionally store the credentials entered by the user at step S128. In one embodiment, only credentials that have been successfully used to log into a computer resource are stored. In one embodiment, the framework can be executed on a computer system 30 and the credentials can be stored in the memory 34 thereof. The stored credentials can be encrypted for security purposes, for example using a blowfish cipher or other encryption method known to those having ordinary skill in the art. In one embodiment, the first credentials stored by the framework can be referred to as the "default" credentials.

Figure 7:
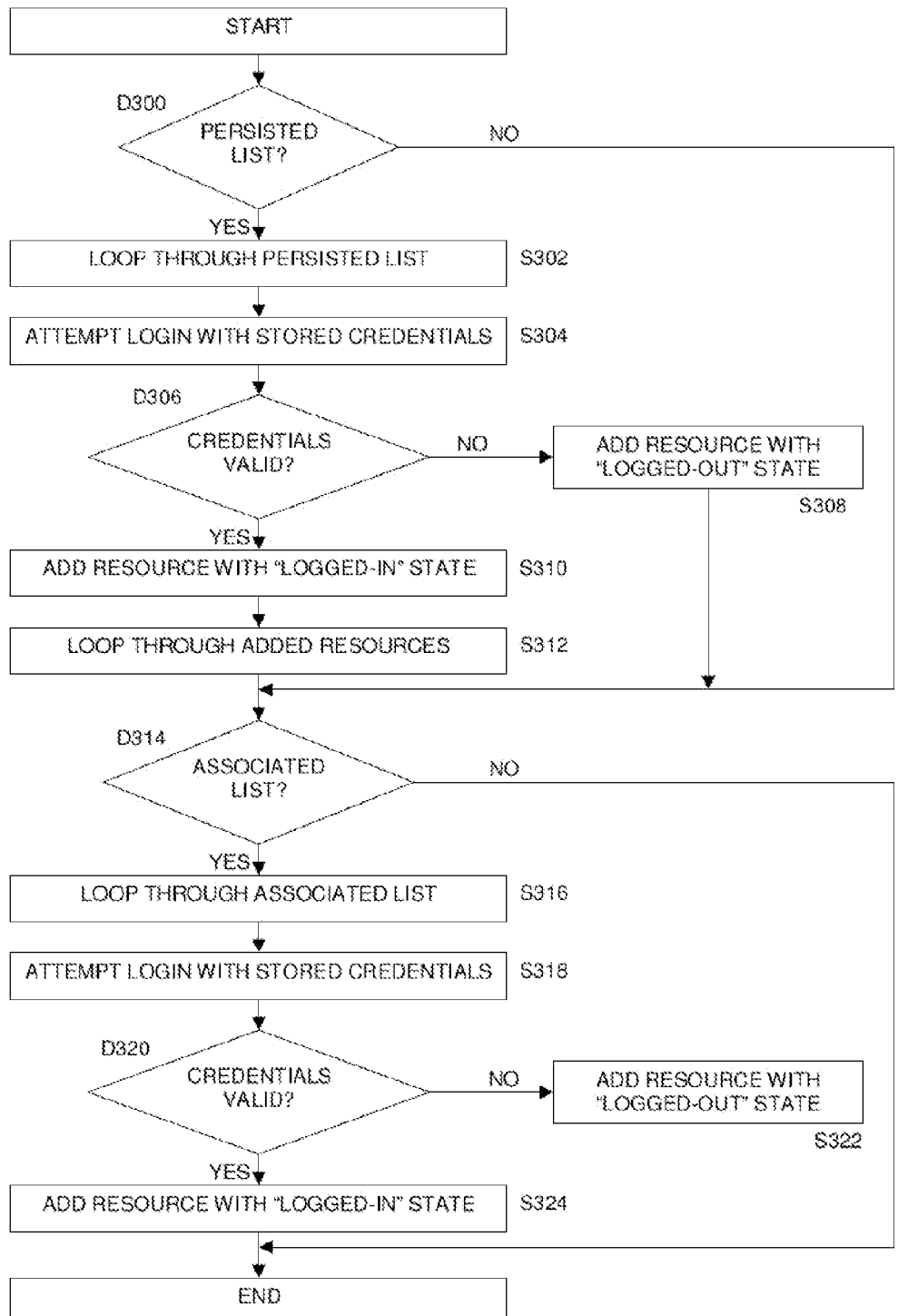
FIG. 7 is a flowchart of one embodiment of a method for discovering additional computer resources to log into.

The framework can also determine at step S130 if other computer resources should be logged into and whether scopes can be added therefor. FIG. 7 illustrates a flowchart of one exemplary method for making such determinations. As shown, the framework and/or one or more plugins associated therewith can determine if a "persisted list" exists at decision block D300. A persisted list can be a list of computer resources. For example, in one embodiment, the computer system 30 upon which the framework application 10 is executed can have an XML file stored in the storage device 40 thereof that includes a list of computer resources. The XML file can also contain various other parameters for the computer resources, such as the type or IP address of the resource or the date that the computer resource was last logged into. A person having ordinary skill in the art will appreciate that various other techniques for maintaining a persisted list of computer resources are known in the art. For example, the list can be maintained in a plain-text file, in a system registry, in an online database, etc. The framework can be configured to automatically add a computer resource to the persisted list as soon as it is successfully logged into. The framework can also include features, for example in the main application GUI, to facilitate manual addition or subtraction of computer resources from the persisted list by the user. A user can also manually edit the persisted list directly, for example by opening the XML file containing the list in an appropriate editor. Each registered plugin can maintain its own persisted list of computer resources or the framework can maintain a single master persisted list of resources.

The maintenance of one or more persisted lists can desirably avoid a situation where a user has to re-enter the addresses of several resources they would like to log into each time the framework application is launched. In other words, the persisted list can keep track of the resources that users generally seek to log into and can maintain that list across login sessions. In one embodiment, separate persisted lists can be maintained for each of a plurality of users. The framework can also be configured to allow a user to maintain a separate list or lists of "favorite" resources and can provide a mechanism (e.g., a dialog box or component included therein) for allowing the user to select which list or lists to log into during a particular session. The framework can include various other user options or preferences with respect to persisted lists, such as an option to not automatically add resources that are logged into to any persisted list. As mentioned above, the credentials dialog can also include a "persist resource" checkbox 222. When checked, the computer resource being logged into can be added to one or more persisted lists. By un-checking the checkbox 222, the user can instruct the framework not to store this particular resource on any persisted list.

If it is determined at decision block D300 that a persisted list exists and is available to the framework, the framework can loop through the persisted list at step S302. For each computer resource in the persisted list, the framework can attempt to log into the resource using the default credentials stored at step S128 of FIG. 4 in step S304. Because the computer resources in the persisted list are generally different from the computer resource for which the user entered the stored default credentials, the stored default credentials will not necessarily be valid for the resources in the persisted list. The validity of the stored credentials can be determined for each resource in the persisted list at decision block D306. If the stored credentials are not valid, a scope can be added for the given resource at step S308 and the scope's state can be set to "LOGGED-OUT." If the stored credentials are valid, a scope can be added for the given resource and the scope's state be set to "LOGGED-IN." This process can be repeated for each computer resource in the persisted list.

Once login attempts have been made to each resource in the persisted list(s), or in the case where no persisted list is present, the framework can look for still further resources at step S312. In step S312, the framework (via the plugins and/or login candidates registered therewith), can poll each computer resource for which a scope has been added to determine if that computer resource knows of any other computer resources. For example, referring to FIG. 1, computer resources of type B might be configured to maintain a list of all computer resources of type B available over the communication medium 16. Thus, at step S312, if a scope has been added for the computer resource B_0, the framework 10 can poll the resource B_0 for a list of known resources. The resource B_0 can then transmit a list to the framework 10 that contains all resources known thereto, which in the illustrated embodiment would include computer resources B_1, B_2, and B_3.

If it is determined at decision block D314 that the added resource provided a list of associated resources, the framework can then add these resources to one or more persisted lists and attempt to log into them using the default credentials or any other credentials that may be stored. For example, the framework can loop through each resource in the associated list(s) at step S316. The framework can attempt to log into each resource in the associated list(s) at step S318 using stored login credentials. It will be appreciated that the resources in the persisted list and/or the resources in the associated list or lists can have varying types. Accordingly, the framework can use one or more of the registered login candidates to communicate with and log into such resources. In the event that no login candidate can be found for communicating with a resource in the persisted list or the associated list(s), a scope can be added for that resource with a state of "LOGGED-OUT" as described above.

Similarly, if it is determined at decision block D320 that the various stored credentials are not valid for a particular resource in the associated list(s), a scope can be added for that resource with a state of "LOGGED-OUT" at step S322. If, on the other hand, any of the stored credentials are valid for a particular resource, a scope can be added for that resource with a state of "LOGGED-IN" at step S324. The process can repeat recursively, assembling a list of all resources that are either represented in a persisted list or in a list maintained by any resource which has already been identified. In so doing, the framework can dynamically discover an entire "universe" of computer resources that are available for logging in and that may be of interest to a user. The framework can attempt to log into each of such resources using the stored credentials, thereby avoiding a situation where, for example, a user has to enter the same username and password dozens of times to log into dozens of computer resources.

Figure 8:
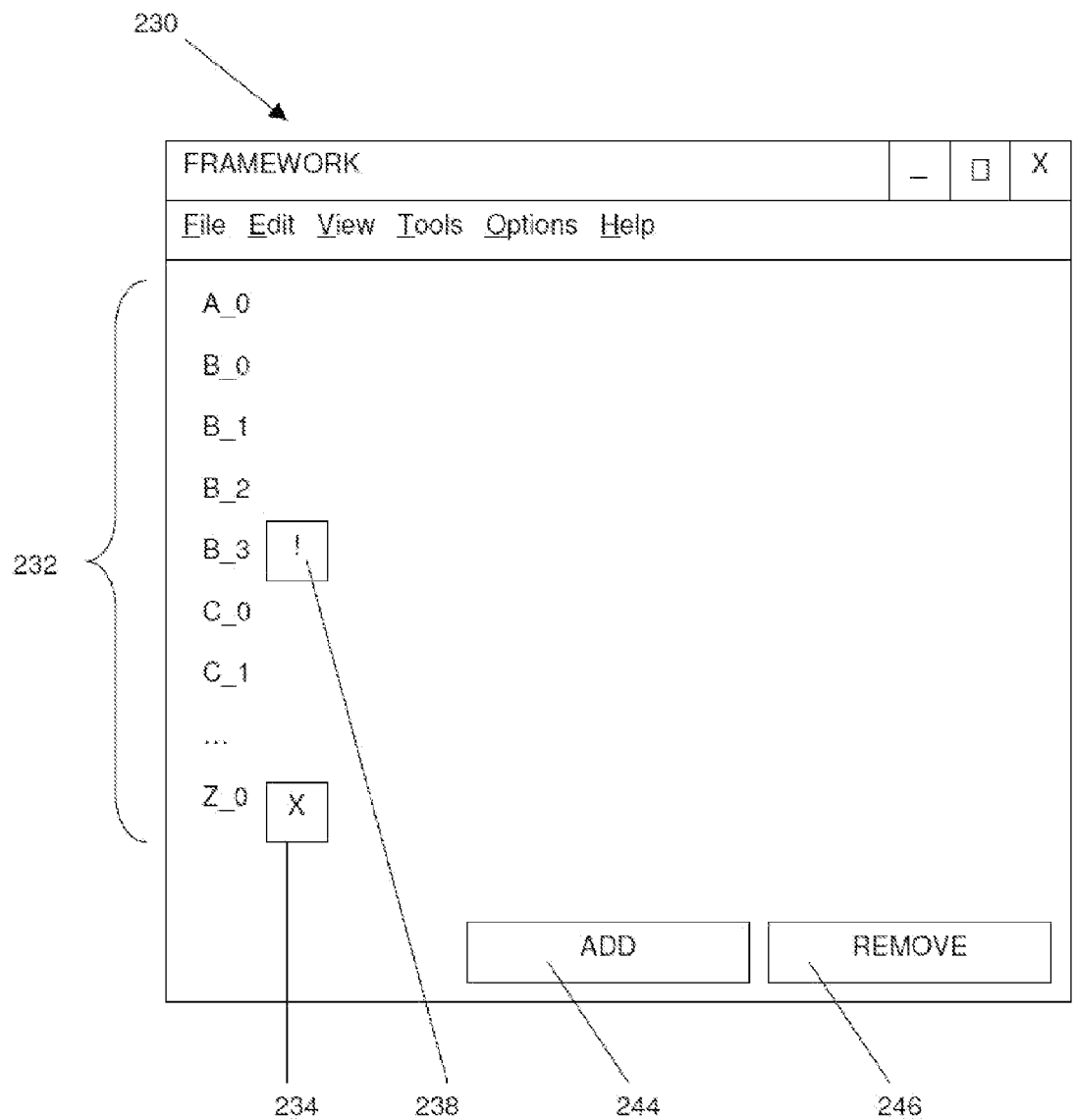
FIG. 8 is an illustration of one embodiment of a main framework application GUI.

Referring again to FIG. 4, the framework can display a main framework application GUI at step S132, which in one embodiment can display a list of all computer resources for which a scope has been added. FIG. 8 illustrates one embodiment of a main application GUI 230. In the illustrated embodiment, the GUI includes a list 232 that corresponds to the computer resources 14 of FIG. 1. The GUI 230 can also include an add button 244 and/or a remove button 246 for adding and removing computer resource scopes. When a user clicks the add button 244, they can be prompted for an IP address or other indicator of a resource to add. As explained above, this address can be added to the persisted list and the framework can attempt to log into that resource using the default credentials. If the default credentials are unsuccessful, any resource-specific credentials that may be stored by the framework or the various plugins can be applied to the added resource in an attempt to login. If none of these are successful, the user can be prompted for credentials, which can be stored by the plugin if they are successful. The user can also select the remove button 246 to remove a resource from the list 232, which can also include conducting a log out procedure with the computer resource. The resource can optionally also be removed from any persisted list(s) as well.

Figure 9:
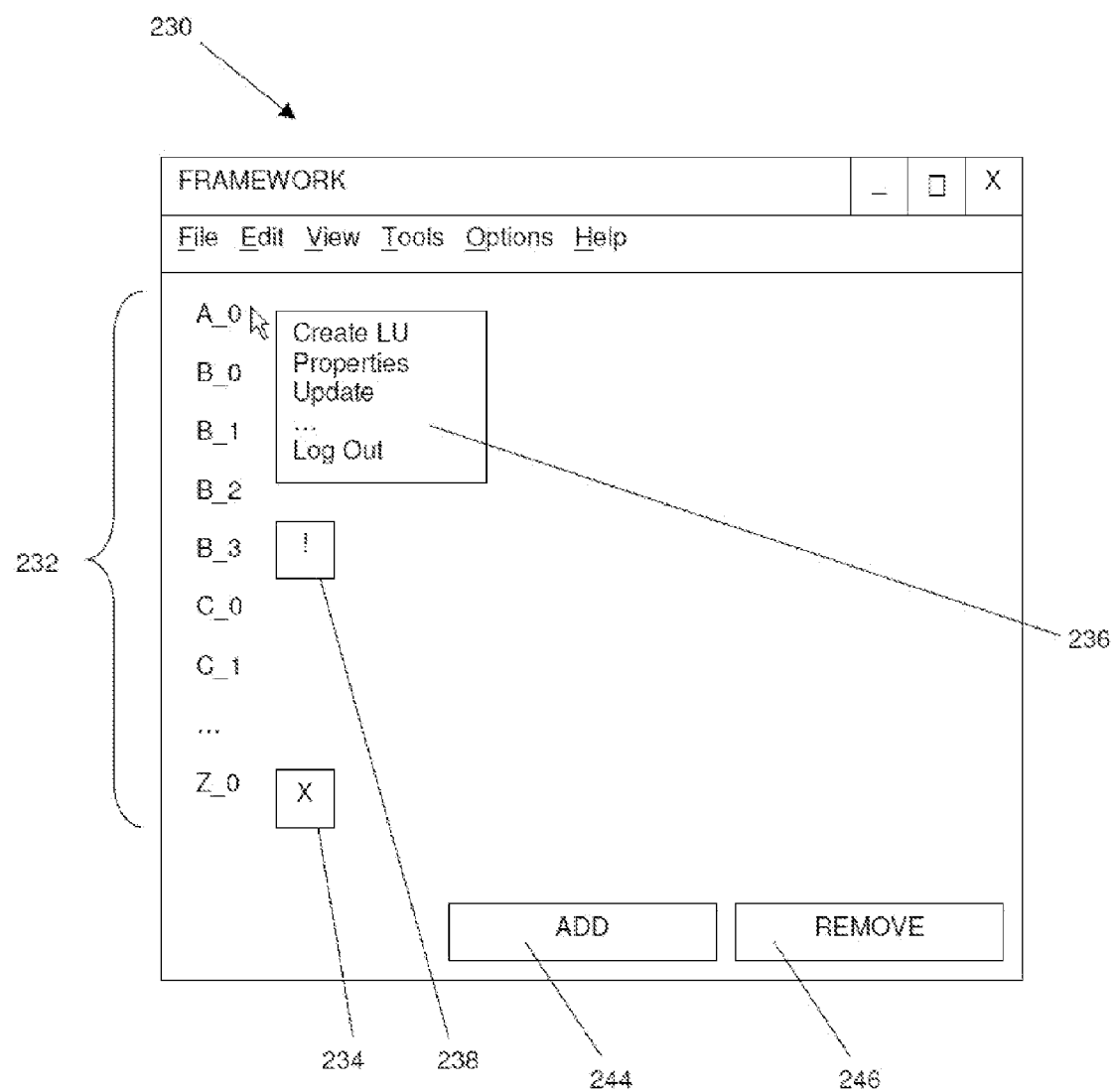
FIG. 9 is an illustration of the GUI of FIG. 8 and one embodiment of a pop-up menu.

A user can select a computer resource in the list 232 and conduct various tasks with respect thereto using various GUI features known in the art, such as keyboard shortcuts, menu bars, status bars, pop-up context menus, etc. For example, as shown in FIG. 9, if a user right-clicks on the computer resource A_0 in the list 232, a pop-up menu 236 can be displayed with various menu options. Since computer resource A_0 is a data storage system, the menu 236 includes various options specific to such systems. For example, the user can choose "CREATE LU" to initiate the process of creating a logical unit (a logical association of physical disks in the storage system A_0). Likewise, the user can choose to view various properties of the system A_0, update the status of the system A_0, or log out of the system A_0.

Figure 10:
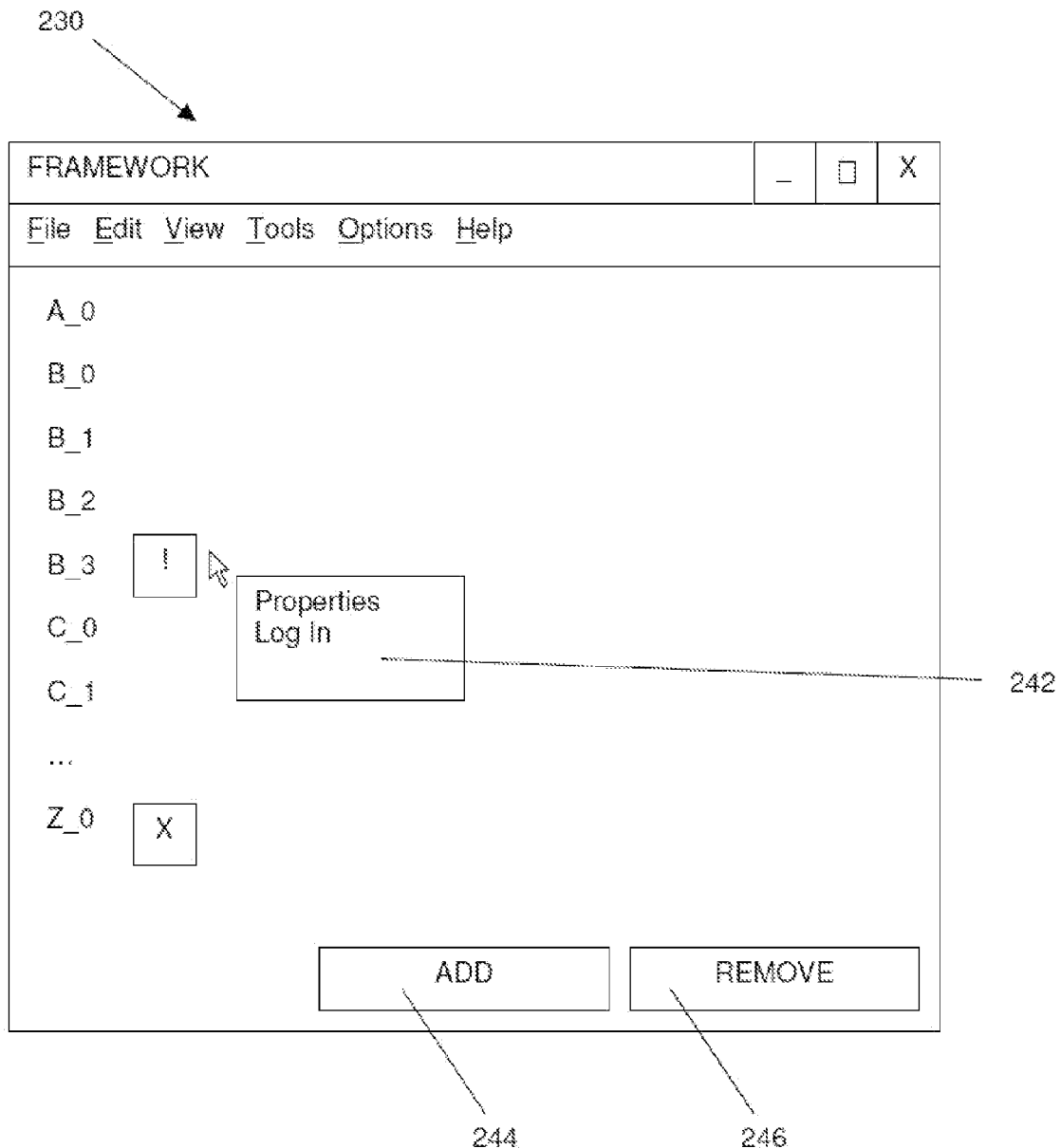
FIG. 10 is an illustration of the GUI of FIG. 8 and another embodiment of a pop-up menu.

As shown in FIG. 9, the GUI can also include one or more icons 234 that correspond to each of the listed computer resources. For example, the icon 238 for computer resource B_3 can indicate to a user that this resource has a state of "LOGGED-OUT." This icon might be displayed if, for example, the framework attempted to log into the resource B_3 using the stored credentials but found that they were not valid for that resource. As shown in FIG. 10, if a user right-clicks on the computer resource B_3, a different pop-up menu 242 can be displayed with a more limited set of options. In the illustrated embodiment, the user can only choose to view various properties of the resource B_3 (if available to a user that is not logged in) or to attempt to log into the resource B_3.

Figure 11:
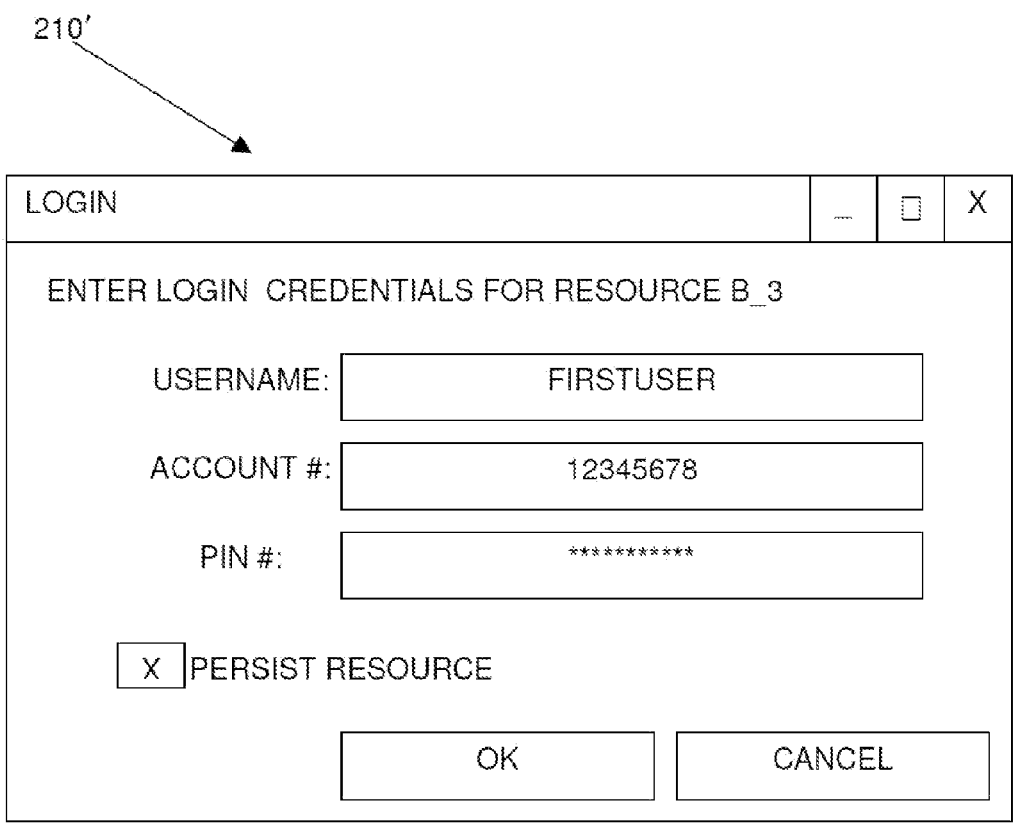
FIG. 11 is an illustration of one embodiment of a computer resource-specific credentials dialog.

If the latter option is chosen, the framework can communicate with the login candidate associated with systems of resource B_3's type (in this case CANDIDATE_B) to determine what credentials are required for such resources. The framework can then display a credentials dialog 210' specific to computer resources of type B, as shown for example in FIG. 11. As shown, the credentials dialog 210' includes fields for a user to enter a username, an account number, and a personal identification number (PIN). Once valid credentials are entered for any resource, they too can be stored by the framework and/or any plugin registered therewith. The framework can thus store a plurality of credential "sets" and attempt to re-use each of such sets whenever a new resource is to be logged into.

It will be appreciated that in some cases, the stored credentials and the credentials required for logging into a resource having a "LOGGED-OUT" state can be of the same type and simply have different values. For example, a "LOGGED-OUT" resource might require a username and a password. Although the stored credentials might also include a username and a password, they may not be the specific username and password required by the "LOGGED-OUT" resource. In this case, the resource-specific credentials dialog can be very similar or even identical to the initial credentials dialog in which the stored credentials were entered.

Figure 12:
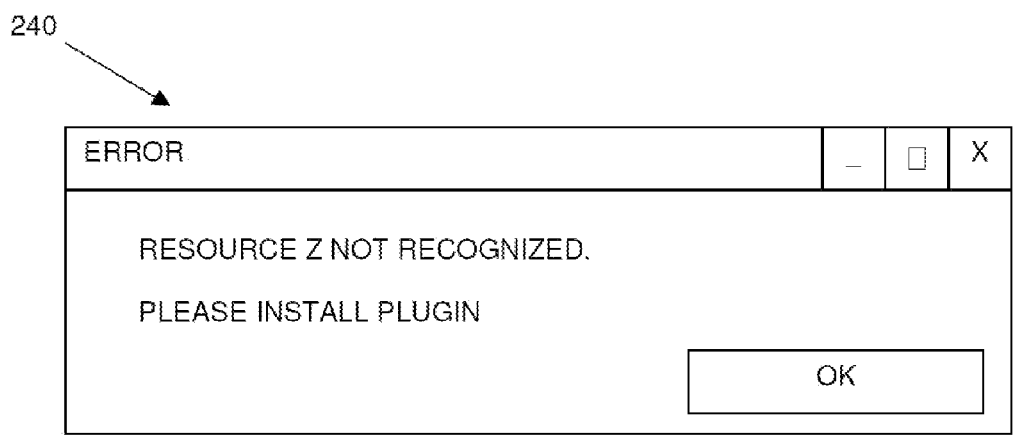
FIG. 12 is an illustration of one embodiment of an error dialog.

The user can log into each of the "LOGGED-OUT" resources by right-clicking on their corresponding list entry, selecting "LOG IN," and manually entering the requested login information. In some cases however, a resource can have a "LOGGED-OUT" state not because the stored credentials are invalid for that resource, but rather because no login candidate exists for resources of that type. For example, in the embodiment illustrated in FIGS. 1 and 8, if the user attempts to manually log into resource Z_0, for which no corresponding login candidate exists, an error dialog will be displayed. FIG. 12 illustrates one exemplary embodiment of such an error dialog 240. As shown, the dialog 240 indicates to the user that resources of type Z are not recognized by the framework, and that an appropriate plugin having an appropriate login candidate for resources of type Z should be installed in order to proceed.

In one embodiment, instead of adding scopes having a "LOGGED-OUT" state for resources that could not be logged into, the framework can immediately prompt the user when such resources are encountered. In such embodiments, the framework can prompt the user for credentials or display an error message as each resource is encountered, instead of or in addition to adding a scope for them and letting the user later choose to manually log them in.

The framework application and the main GUI thereof can be used to conduct a variety of other tasks with respect to the resources for which a scope has been added, once such resources are logged in. In the case of a storage system management application, the GUI can be used to perform a variety of management tasks, some of which may require restarting or disconnecting from/reconnecting to a resource. Since the login credentials for such resources can be stored by the framework and/or by one or more of the plugins, the user does not have to be prompted over and over again to enter credentials.

When a user exits, closes, terminates, or logs out of the framework application, a logout procedure can optionally be performed on each of the computer resources that were logged into during the framework session. For example, the framework, upon receiving a termination event/message, can instruct the registered plugins and/or registered login candidates to conduct a log out procedure with each of the various logged-in computer resources.

The methods and systems illustrated and described herein can thus provide a more user-friendly and efficient way to log into a plurality of computer resources. These methods and systems are particularly useful in cases where many or all of the computer resources require the same types of login credentials and the same specific credential values (e.g., where all resources require a username and a password and also require the same username and password). Even in cases where some or all of the resources have differing credential requirements, the methods and systems disclosed herein can provide an efficient way to selectively log into such resources and re-use the entered login credentials wherever possible. In addition, because the methods and systems described herein can include plugins for interfacing with various types of computer resources, they can provide a pluggable architecture in which a virtually unlimited variety of resource types can be logged in through a common framework application.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A system for handling logins for a first user accessing a plurality of computer resources of at least one type, with each computer resource needing to be logged into, across a computer network, comprising:
   one or more processors each connected to memory and programmed to provide:
   a) a software framework having a login service;
   b) at least one software plugin that communicates with the framework, wherein the at least one plugin includes one or more login candidates, each login candidate representing a type of a computer resource and each login candidate registering with the login service;
   the one or more processors further being programmed to:
   upon request from the first user for access to a first computer resource across the computer network, review the login candidate registrations of the login service to find a first login candidate representing the type of the first computer resource;
   communicate with the first login candidate to determine login information needed to access the first computer resource;
   prompt the first user for the login information and receive the login information;
   apply the login information received to log the first user into the first computer resource;
   acquire a list of one or more computer resources;
   using the login information, automatically, without requiring additional user input, attempt to log into each computer resource in the list having a type for which a corresponding login candidate has been registered:
   wherein the one or more processors are further programmed to:
   upon request from the first user for access to a second computer resource across the computer network, review the login candidate registrations of the login service to find a second login candidate representing a type of the second computer resource;
   communicate with the second login candidate to determine login information needed to access the second computer resource;
   if any of the login information needed to access the second computer resource is not already stored by the one or more processors, prompt the first user for any needed and unstored login information; and apply the login information to log the first user into the second computer resource.

2. The system of claim 1, wherein a plurality of the computer resources are storage devices.

3. The system of claim 1, wherein all of the computer resources are storage devices.

4. The system of claim 1, wherein the list of computer resources is acquired from the first computer resource after logging in.

5. The system of claim 1, wherein the list of computer resources is persisted in and acquired from a storage device coupled to the one or more processors.

6. The system of claim 1, wherein the login information comprises at least one of a user name, a password, an image of a fingerprint, an account number, and a personal identification number.

7. The system of claim 1, wherein the one or more processors are further programmed to store the login information.

8. A non-transitory computer-readable storage medium with an executable program stored thereon for handling logins for a first user accessing a plurality of computer resources of at least one type, with each computer resource needing to be logged into, across a computer network, wherein the program instructs one or more processors to:

provide a software framework having a login service;

provide at least one software plugin that communicates with the framework, wherein the at least one plugin includes one or more login candidates, each login candidate representing a type of a computer resource and each login candidate registering with the login service;

upon request from the first user for access to a first computer resource across the computer network, review the login candidate registrations of the login service to find a first login candidate representing the type of the first computer resource;

communicate with the first login candidate to determine login information needed to access the first computer resource;

prompt the first user for the login information and receive the login information;

apply the login information received to log the first user into the first computer resource;

acquire a list of one or more computer resources;

using the login information, automatically, without requiring additional user input, attempt to log into each computer resource in the list having a type for which a corresponding login candidate has been registered;

wherein the program further interacts the one or more processors to:

upon request from the first user for access to a second computer resource across the computer network, review the login candidate registrations of the login service to find a second login candidate representing a type of the second computer resource;

communicate with the second login candidate to determine login information needed to access the second computer resource;

if any of the login information needed to access the second computer resource is not already stored by the one or more processors, prompt the first user for any needed and unstored login information; and apply the login information to log the first user into the second computer resource.

9. The storage medium of claim 8, wherein a plurality of the computer resources are storage devices.

10. The storage medium of claim 8, wherein all of the computer resources are storage devices.

11. The storage medium claim 8, wherein the list of computer resources is acquired from the first computer resource after logging in.

12. The storage medium of claim 8, wherein the list of computer resources is persisted in and acquired from a storage device coupled to the one or more processors.

13. The storage medium of claim 8, wherein the login information comprises at least one of a user name, a password, an image of a fingerprint, an account number, and a personal identification number.

14. The storage medium of claim 8, wherein the program further instructs the one or more processors to store the login information.

* * * * *